United States Patent [19]

Blankenship et al.

[11] Patent Number: 4,478,489
[45] Date of Patent: Oct. 23, 1984

[54] POLARIZATION RETAINING SINGLE-MODE OPTICAL WAVEGUIDE

[75] Inventors: Michael G. Blankenship, Corning; Donald B. Keck, Big Flats, both of N.Y.

[73] Assignee: Corning Glass Works, Corning, N.Y.

[21] Appl. No.: 479,490

[22] Filed: Mar. 28, 1983

Related U.S. Application Data

[62] Division of Ser. No. 253,224, Apr. 13, 1981, Pat. No. 4,395,270.

[51] Int. Cl.³ ............................................. G02B 5/172
[52] U.S. Cl. ................................ 350/96.30; 350/96.33
[58] Field of Search ........................... 350/96.30, 96.33

[56] References Cited

U.S. PATENT DOCUMENTS 4,179,189 12/1979 Kaminow et al. ............... 350/96.33
4,354,736 10/1982 Maklad et al. ............... 350/96.30 X
4,415,230 11/1983 Keck ................................ 350/96.30

Primary Examiner—John D. Lee
Assistant Examiner—Akm E. Ullah
Attorney, Agent, or Firm—W. J. Simmons, Jr.

[57] ABSTRACT

A single mode optical waveguide is fabricated in a manner such that the core thereof is subjected to a stress-induced birefringence. This characteristic is accomplished by introducing into the cladding region of the fiber on opposite sides of the core longitudinally extending regions of glass having a thermal coefficient of expansion different from that of the remainder of the cladding. A number of novel techniques are disclosed for forming such a fiber.

10 Claims, 11 Drawing Figures

POLARIZATION RETAINING SINGLE-MODE OPTICAL WAVEGUIDE

This is a division of application Ser. No. 253,224, filed Apr. 13, 1981, now U.S. Pat. No. 4,395,270.

BACKGROUND OF THE INVENTION

In many applications of single mode optical waveguides, e.g. gyroscopes, sensors and the like, it is important that the propagating optical signal retain the polarization characteristics of the input light in the presence of external depolarizing perturbations. This requires the waveguide to have an azimuthal asymmetry of the refractive index profile.

A slight improvement in the polarization performance of single mode optical waveguides is achieved by distorting the fiber core symmetry as a means of decoupling the differently polarized waves. Two such optical fiber waveguides are disclosed in U.S. Pat. No. 4,184,859 and in the publication by V. Ramaswamy et al., "Influence of Noncircular Core on the Polarization Performance of Single Mode Fibers", Electronics Letters, Vol. 14, No. 5, pp. 143-144, 1978. However, the Ramaswamy publication reports that measurements on borosilicate fibers with noncircular cores indicate that the noncircular geometry and the associated stress-induced birefringence alone are not sufficient to maintain polarization in single mode fibers.

The invention disclosed in U.K. Patent Application GB No. 2,012,983 A issued to I. P. Kaminow et al. is based upon the recognition that orthogonally polarized waves are more efficiently decoupled in a waveguide that is fabricated in such a manner as to deliberately enhance stress-induced, or strain birefringence. That patent teaches that such behavior is accomplished by introducing a geometrical and material asymmetry in the preform from which the optical fiber is drawn. The strain-induced birefringence is introduced by at least partially surrounding the single mode waveguide by an outer jacket having a different thermal coefficient of expansion (TCE) than that of the waveguide and a thickness along one direction that is different from its thickness along a direction orthogonal to the one direction. For example, the preform may be a three-layered structure comprising an inner core region surrounded by a cladding layer which is in turn surrounded by an outer jacket layer having a TCE different than that of the cladding layer. Diametrically opposed portions of the outer layer are ground away, and the resultant preform is drawn into a fiber approximating a slab configuration in which the thicknesses of the outer jacket layer are different in two orthogonal directions. A similar result can be accomplished by constructing the preform from an inner core region, a cladding region and two outer jacket layers oppositely disposed along the longitudinal surface of the preform. Difficulty can be encountered in the manufacture of that type of preform since stress is built up in the outer layer. When grinding the outer layer or when cutting slots therein, the built-up stress has a tendency to cause the preform to break. Assuming that a fiber can be drawn from the preform, the stress-forming outer layer is far removed from the fiber core, and therefore, the effect of the stress on the core is minimal.

In one embodiment of GB 2,012,983 A represented by FIGS. 10-15, a relatively thick substrate tube forms the outer portion of the optical fiber. In order to impart to the fiber the desired characteristics, either the inner or outer surface of the substrate tube is non-circular. Because at least a portion of the substrate wall must be relatively thick, the efficiency of deposition is adversely affected.

SUMMARY OF THE INVENTION

It is therefore an object of the present invention to provide a single polarization single mode optical waveguide exhibiting stress-induced birefringence without modification of the outer surface thereof. Another object is to provide a polarization maintaining single mode optical waveguide which can be manufactured by a technique which does not weaken the preform.

The present invention relates to an optical waveguide comprising a core of transparent glass and a layer of cladding glass on the surface of the core, the refractive index of the core glass being greater than that of the cladding glass. Two dimetrically opposed longitudinally-extending regions, which are located in the cladding, are formed of a glass having a TCE different from that of the cladding glass.

The fiber of the present invention can be formed by the following method. A first coating of glass soot is deposited on a rotating mandrel. A second coating of glass soot having a refractive index lower than that of the first coating is deposited over the first coating. First and second longitudinally extending regions of glass soot having a TCE different from that of the second coating are deposited on diametrically opposed portions of the second coating. A coating of cladding soot is deposited on the outer surface of the resultant soot body. The TCE of the cladding soot is similar to that of the second coating, and the refractive index of the cladding soot is equal to or lower than that of the second coating. The mandrel is removed, and the resultant soot preform is formed into an optical waveguide fiber.

DESCRIPTION OF THE PREFERRED EMBODIMENTS

Figure 1:
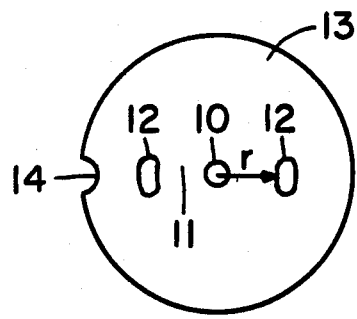
FIG. 1 is a cross-sectional view of an optical waveguide fiber constructed in accordance with the present invention.

FIG. 1 shows a cross-sectional view of a single polarization optical waveguide fiber comprising a core 10 surrounded by an inner cladding region 11. Core 10 and cladding region 11 may be formed of conventional materials employed in the formation of optical waveguides. The salient characteristics of these materials are that the refractive index of the core material must be greater than that of the cladding material and that both materials must exhibit low losses at the wavelength at which the waveguide is intended to be operated. By way of example only, core 10 may consist of silica containing one or more dopants which increase the refractive index thereof. Region 11 may comprise pure silica, silica containing a lesser amount of dopant than core 10, or silica containing one or more dopants, at least one of which is an oxide of an element such as boron or fluorine which lowers the refractive index of silica. Moreover, as is well known in the art, base glass materials other than silica may be employed.

Diametrically opposed relative to core 10 are two narrow, longitudinally-extending regions 12 formed of a material having a TCE different from that of material 11. While regions 12 are illustrated as being of somewhat random cross-section in FIG. 1, methods will be described below which result in the formation of these regions in various specific shapes. When such a fiber is drawn, the longitudinally-extending regions 12 and the cladding regions disposed orthogonally thereto will shrink different amounts whereby regions 12 will be put into a state of tension or compression depending upon the TCE thereof relative to that of the cladding. A strain induced birefringence, which is thus induced in the fiber, reduces coupling between the two orthogonally polarized fundamental modes. Surrounding regions 12 is an outer cladding region 13, the refractive index of which is preferably equal to or less than that of inner cladding region 11. Region 13 may consist, for example, of any of the materials specified above for use as cladding region 11.

The outer surface of cladding region 13 may be circular as illustrated in FIG. 1, or it may have areas which are flattened in the manner disclosed in the aforementioned Kaminow et al. patent for the purpose of aligning a fiber with a polarized light source or with another fiber to which it is to be connected. If the outer surface of cladding 13 is substantially circular, means such as longitudinal depression 14 may be provided for alignment purposes. If it is preferred that the outer surface of the fiber be substantially circular, the input end of the fiber can be properly oriented during its installation into a system. The input end is connected to a polarized light source, and an analyzer is connected to the output end of the fiber. The input end of the fiber is rotated relative to the source until a maximum or a minimum is detected in the light emanating from the output end. When either the maximum or minimum light output is detected, the input end of the fiber is then fixedly mounted with respect to the polarized light source.

Regions 12 should be as close as possible to core 10 without inordinately affecting the light transmitting properties of the fiber. If regions 12 are formed of low loss material having the same refractive index as inner cladding region 11, then the minimum radius $r_m$ of regions 12 is about $1.5r_a$, where $r_a$ is the radius of core 10. A matching of the refractive index of regions 12 to that of the cladding could be accomplished by employing a cladding formed of $SiO_2$ and forming the stress-inducing regions 12 of, for example, $SiO_2$ doped with one of the following combinations of dopant oxides: $GeO_2$ and $B_2O_3$ or $P_2O_5$ and $B_2O_3$ or $GeO_2$, $P_2O_5$ and $B_2O_3$. An example of a suitable high TCE composition having a refractive index substantially the same as pure $SiO_2$ is $SiO_2$ doped with 12 wt. % $B_2O_3$ and 4 wt. % $P_2O_5$. To ensure that the resultant fiber possesses low loss characteristics, at least the entire central region, i.e. the core and inner cladding region, should be formed by a chemical vapor deposition (CVD) process. If the refractive indices of these two regions are not matched and rm is too small, i.e. less than about $1.5r_a$, regions 12 can cause light transmission loss due to scattering.

If regions 12 adversely affect the light transmission properties of the fiber, e.g. the regions 12 are formed of a material which inordinately absorbs light at the transmission wavelengths, the inner radius $r_m$ of these regions should be at least three times and preferably a minimum of five times the radius of the core. This estimate is based on the findings reported in the publication: *Electronics Letters*, Vol. 13, No. 15, pp. 443–445 (1977). Obviously, the adverse effect of light absorbing material increases as the distance from the material to the core decreases. However, the magnitude of the birefringence at the core also decreases as the inner radius $r_m$ of the stress-inducing longitudinally extending regions decreases. The optimal inner radius of regions 12 depends upon the specific type of single mode waveguide employed, since the amount of light propagating beyond the core region of a single mode waveguide depends upon such parameters as core radius and refractive index.

A fiber may contain a second set of diametrically opposed longitudinally-extending regions having physical characteristics which are different from those of the first set of stress-inducing regions. The fiber illustrated in FIG. 2 comprises core 16, inner cladding region 17, and outer cladding region 18. Two longitudinally-extending regions 19, which have a TCE different from that of the cladding regions, are diametrically opposed relative to core 16. Orthogonally disposed with respect to regions 19 is a second pair of longitudinally extending regions 20 which may comprise a light absorbing glass or a glass having a TCE which deviates from that of region 17 in a direction different from the direction in which the TCE of region 19 deviates from that of region 17. For example, the TCE of regions 20 should be less than the TCE of region 17 if the TCE of regions 19 is greater than the TCE of region 17.

If the cladding regions consisted of pure $SiO_2$, regions 19 could comprise $SiO_2$ doped with $B_2O_3$ and $P_2O_5$ while regions 20 could comprise $SiO_2$ doped with $TiO_2$. Regions 19 will be in a state of tension while regions 20 will be in a state of compression. The effect of the two tensive regions is additive with that of the two compressive regions, the resultant combination providing a greater magnitude of stress-induced birefringence than that which would be obtainable with either regions 19 or regions 20 alone.

The $TiO_2$ doped regions are lossy for two reasons. The $TiO_2$-$SiO_2$ glass tends to phase separate and form small inhomogeneous scattering sites which increase scattering loss. Also, the $TiO_2$ raises the refractive index of the region to a value greater than that of region 17 so that light from core 16 that reaches regions 20 will tend to refract into and through regions 20 and thus away from core 16. Stress regions can be made lossy by forming them from glass rods which have been melted in crucibles containing absorption impurities such as iron, nickel, cobalt, copper and the like.

Figure 3:
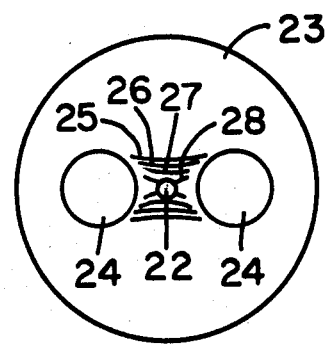

The aforementioned Kaminow et al. patent states that the methods disclosed therein are capable of fabricating fibers with a strain birefringence $\Delta n$ as large as $40 \times 10^{-5}$ and that the beat length L for such a value of $\Delta n$ is 2.5 mm at 1 $\mu$m wavelength and 1.25 mm at 0.5 $\mu$m. Some applications, however, require even shorter beat lengths, thereby necessitating values of $\Delta n$ around $10^{-3}$. The following theoretical example indicates that such values of $\Delta n$ are easily achieved by the fiber construction of the present invention. Referring to FIG. 3, there is illustrated a fiber having a core 22, cladding 23 and two longitudinal regions 24 of circular cross-section. The diameter of core 22 is 5 $\mu$m, that of stress-producing regions 24 is 25 $\mu$m and that of cladding 23 is 125 $\mu$m. The centers of circular regions 24 are located at a radius of 25 $\mu$m. The specific composition of core 22 is immaterial, it merely being necessary that the refractive index thereof be greater than that of cladding 23 which consists of pure $SiO_2$. The composition of regions 24 is 5 wt. % $P_2O_5$, 12 wt. % $B_2O_3$ and 83 wt. % $SiO_2$. Birefringence calculations were based on the publication: G. W. Scherer, "Stress-Induced Index Profile Distortion in Optical Waveguides", *Applied Optics*, Vol. 19, No. 12, June, 1980, pp. 2000-2006. Using computer techniques, the birefringence in the region of the core and inner cladding due to one of the regions 24 was determined. Then the birefringence in the central region due to the other of regions 24 was determined and added to the first calculated value. The results are plotted in FIG. 3. Lines 25, 26, 27 and 28 are lines of equal birefringence of $0.4 \times 10^{-3}$, $0.5 \times 10^{-3}$, $0.6 \times 10^{-3}$ and $0.7 \times 10^{-3}$, respectively, the latter line passing through core 22.

One method for forming the fiber of the present invention employs a flame hydrolysis process similar to that disclosed in U.S. Pat. Nos. 3,737,292 and 4,165,223. The resultant fiber is shown in cross-section in FIG. 6 wherein elements similar to those in FIG. 1 are represented by primed reference numerals. The fiber of FIG. 6 differs from that of FIG. 1 in that longitudinally extending stress-inducing regions 12' are crescent-shaped.

Figure 4:
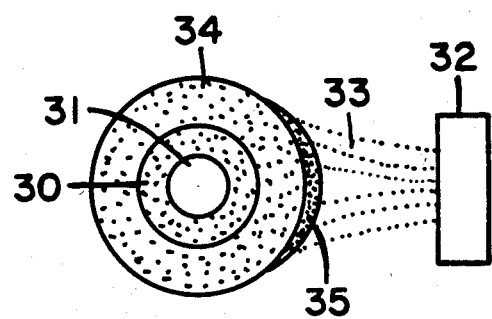
FIG. 4 shows an apparatus for forming one of the embodiments of the present invention.
Figure 5:
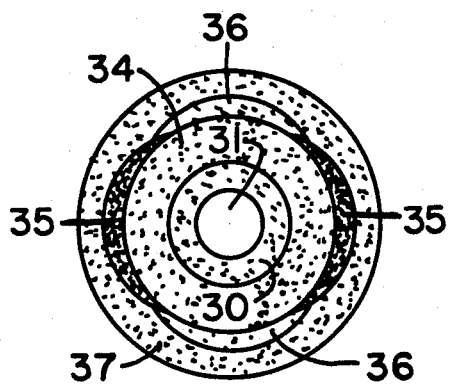
FIG. 5 is a cross-sectional view of a finished soot preform as formed by the apparatus of FIG. 4.
Figure 6:
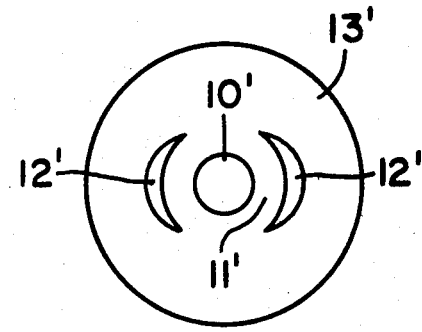
FIG. 6 is a cross-sectional view of a fiber drawn from the preform of FIG. 5.

Referring to FIG. 4, there is shown an apparatus which is now conventionally employed in the manufacture of low loss optical waveguide fibers. A layer 30 of glass soot is initially deposited on a cylindrical glass mandrel 31 by means of flame hydrolysis burner 32 to which fuel, gas and oxygen or air are applied to produce the flame. Burners such as those disclosed in U.S. Pat. Nos. 3,565,345; 3,565,346; 3,609,829 and 3,698,936 may be employed. Liquid constituents required to form the glass soot can be delivered to the burner by any one of the many well known reactant delivery systems known in the prior art. Reference is made in this regard to teachings of U.S. Pat. Nos. 3,826,560; 4,148,621 and 4,173,305. Excess oxygen is supplied to the burner so that the reactant vapors are oxidized within flame 33 to form the glass soot which is directed toward mandrel 31. After the first soot layer 30 reaches a predetermined thickness, the composition is changed and a second soot layer 34, which is to form the inner cladding layer 11', is deposited. During the deposition of layers 30 and 34, mandrel 31 is rotated and burner 32 is translated longitudinally with respect to the mandrel. In order to form the soot which is to be consolidated to form strips 12', the mandrel rotation stops and burner 32 makes a sufficient number of longitudinal passes to form a soot layer 35. Mandrel 31 is rotated 180° and a second soot layer 35 is deposited opposite the first one as shown in FIG. 5. Layers 36 of cladding soot can be deposited on layer 34 between strips 35 in the same manner. A layer 37 of cladding soot is then deposited by resuming mandrel rotation. The soot preform, when completed, is porous in form and must be heated to fuse or "collapse" it into a monolithic glass preform which can be drawn into an optical waveguide which is shown in FIG. 6.

The steps of depositing strips 36 of cladding glass may be omitted without affecting to too great an extent the geometry of the resultant fiber. If cladding layer 37 is deposited directly upon that portion of the soot preform comprising layer 34 and strips 35 as the outer surface thereof, the soot stream from the burner will deposit a greater amount of soot when the surface of layer 34 is facing the burner than when the surface of strips 35 is facing the burner since a great surface area is presented to the soot stream when surface 34 faces the burner. This tends to decrease the noncircularity of the soot blank cross-section as layer 37 is built up. During drawing of the fiber from a consolidated blank surface tension tends to round the outer surface of the fiber, thereby slightly affecting the circularity of the core. This is not, however, a detrimental feature for single mode waveguides of the type to which the present invention pertains.

Figure 7:
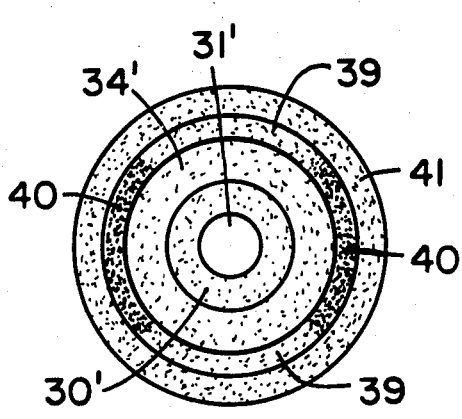
FIG. 7 is a cross-sectional view of a portion of a modified soot preform.

A modified preform produced by the flame hydrolysis process is illustrated in FIG. 7 wherein elements similar to those of FIG. 4 are represented by primed reference numerals. After layers 30', and 34' have been deposited in the manner described in conjunction with FIG. 4, a layer comprising segments 39 and 40 is deposited in the following manner. The soot deposition apparatus should employ a reactant delivery system such as that disclosed in copending application Ser. No. 16,446 filed in the name of M. G. Blankenship on Mar. 1, 1979 and assigned to the assignee of the present application. That application discloses a reactant delivery system whereby reactant vapors are fed to the flame hydrolysis burner by way of flow controllers, the throughputs of which are controlled by a system control circuit. A shaft position indicator connected to mandrel 31' informs the system control circuit as to which part of the soot preform surface presently faces burner 32. A given reactant flow may be employed in the deposition of regions 39, and an additional dopant reactant which affects the expansion coefficient of the deposited glass may be fed to the burner during the deposition of regions 40. Thus, as mandrel 31' rotates at a constant angular velocity, regions 40 are formed by supplying the burner with "pulses" of dopant reactants. Due to the mixing of reactant vapors, a transition region exists between regions 39 and 40. Outer layer 41 of cladding material can be deposited over the layer comprising regions 39 and 40 as discussed above. After mandrel 31' is removed, the preform of FIG. 7 can be drawn into a fiber the cross-sectional configuration of which is similar to that of the fiber shown in FIG. 11 which is to be described hereinbelow.

Instead of depositing a soot-produced outer cladding layer by the flame hydrolysis technique, that layer can be partially or wholly eliminated, and the outer cladding may be provided by a glass tube. For example, after strips 35 and 36 of FIG. 5 are formed, or after the layer comprising regions 11' and 12' of FIG. 6 have been deposited, the mandrel is removed and the soot blank is consolidated. The resultant dense glass blank is inserted into a tube, and the resultant combination is drawn into a fiber in accordance with the teachings of U.S. Pat. No. 3,932,162.

Figure 2:
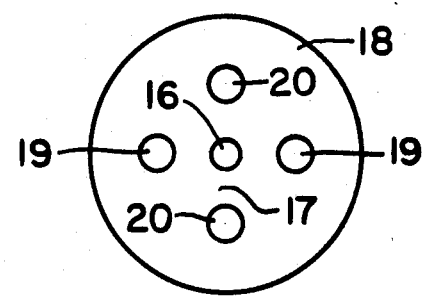
FIGS. 2 and 3 are cross-sectional views of further embodiments of the present invention.
Figure 8:
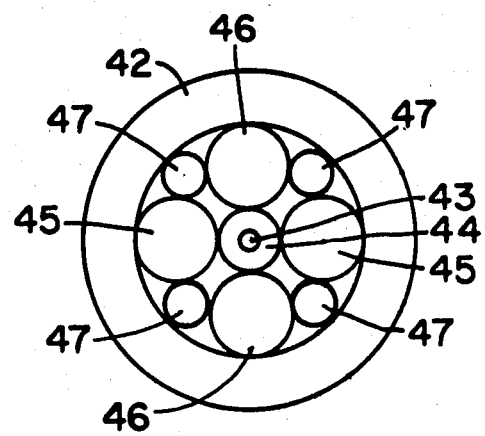
FIG. 8 is a cross-sectional view of a rod-in-tube type draw blank.

Referring to FIG. 8 there is shown a rod-in-tube type preform which may be employed to form fibers of the type illustrated in FIGS. 1–3. A plurality of rods of appropriate material is inserted into tube 42 of a cladding material such as $SiO_2$. Centrally disposed within tube 42 is a rod having a core 43 of high purity glass and a cladding layer 44 of high purity glass having a refractive index lower than that of core 43. Core 43 and cladding 44 are preferably formed by a CVD technique. Diametrically disposed with respect to the central rod are two rods 45 of glass having a high TCE relative to tube 42. A second pair of rods 46 is orthogonally disposed with respect to rods 45. To form a fiber of the type shown in FIGS. 1 and 3, rods 46 can be formed of the same material as tube 42. To form a fiber of the type illustrated in FIG. 2, rods 46 can be formed of a material having a low TCE relative to tube 42 and/or a light-absorbing material. Rods 47 of cladding material occupy some of the interstices between the aforementioned rods. If the resultant preform contains large unoccupied areas, the resultant tensile regions will appear non-circular in cross-section as illustrated in FIG. 1 due to the distortion of the rods as they fill in interstices adjacent thereto. The core of such a fiber will also tend to be non-circular. If all of the illustrated interstices are packed with small rods (not shown) of cladding material, the core and the tensile regions will appear more circular in cross-section in the resultant fiber.

Figure 9:
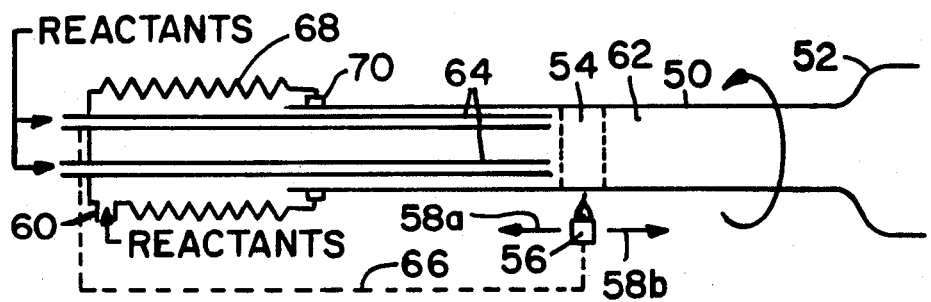
FIG. 9 illustrates an alternative apparatus which can be employed in the formation of a fiber in accordance with the present invention.

FIG. 9 is a schematic representation of an otherwise standard chemical vapor deposition apparatus modified so as to be applicable to the practice of this invention. This system comprises substrate or bait tube 50 which may have an enlarged exhaust tube 52 fixed to the downstream end thereof. Tubes 50 and 52 are chucked in a conventional glass turning lathe (not shown), and the combination may be rotated as indicated by the arrow. A hot zone 54 is caused to traverse tube 50 by moving heating means 56 as schematically depicted by arrows 58a and 58b. Heating means 56 can consist of any suitable source of heat such as a plurality of burners encircling tube 50. In one embodiment hereof, the heating means must be capable of applying heat locally. For example, a single burner or two diametrically opposed burners could be employed. Reactants are introduced into tube 50 via tube 60, which is connected to a plurality of sources of gases and vapors. Any of the aforementioned reactant delivery systems could be employed.

Burner 56 initially moves at a low rate of speed relative to tube 50 in the direction of arrow 58b, the same direction as the reactant flow. The reactants react in hot zone 54 to produce soot which is carried downstream by moving gas where at least a portion of the soot deposits on the inner surface of tube 50 in region 62. As burner 56 continues to move in the direction of arrow 58b, hot zone 54 moves downstream so that a part of the soot buildup extends into the hot zone and is consolidated thereby to form a unitary, homogeneous glassy layer on the inner surface of tube 50. Such process parameters as temperatures, flow rates, reactants and the like can be found in the publications J. B. MacChesney et al., Proceedings of the IEEE, 1280 (1974) and W. G. French et al., Applied Optics, 15 (1976). Reference is also made to the text Vapor *Deposition* edited by C. F. Powell et al., John Wiley & Sons, Inc. (1966).

When burner 56 reaches the end of tube 50 adjacent to exhaust tube 52, the temperature of the flame is reduced and the burner returns in the direction of arrow 58a to the input end of tube 50. Thereafter, additional layers of glassy material are deposited within tube 50 in the manner described above.

After suitable layers have been deposited to serve as the core material and any other desired layers of the resultant optical waveguide, the temperature of the glass is increased to cause tube 50 to collapse. This can be accomplished by reducing the rate of traverse of the hot zone. Preferably, the interior of tube 50 is pressurized during collapse as taught in U.S. Pat. No. 4,154,591 issued to W. G. French et al.

Figure 10:
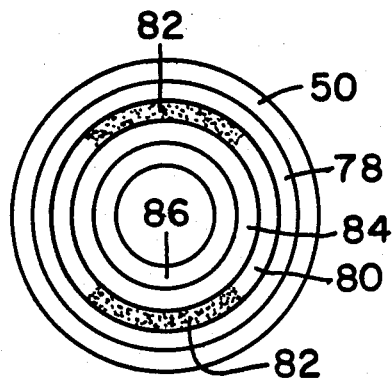
FIG. 10 is a cross-sectional view of a preform formed by the apparatus of FIG. 9.

The conventional apparatus heretofore described is suitable for the deposition of glass layers of uniform composition on the inner surface of tube 50. In accordance with the present invention, the conventional apparatus is modified by the provision of means adjacent to and upstream of the hot zone 54 for delivering to diametrically opposed regions of the hot zone reactant gases capable of forming soot having an expansion coefficient different from that of the cladding glass material. As shown in FIG. 9 a portion of two gas conducting tubes 64 extend into that end of bait tube 50 into which the reactants are introduced. That portion of tubes 64 within tube 50 terminate just prior to hot zone 54. Tubes 64 are mechanically coupled by means represented by dashed line 66 to burner 56 to ensure that tubes 64 are maintained the proper distance upstream of the hot zone 54. Alternatively, the heat source and tubes 64 may be kept stationary, and tube 50 may be caused to move longtudinally. The input end of tube 50 is connected to tubes 64 by a collapsible member 68, a rotating seal 70 being disposed between member 68 and tube 50. While not in use, tubes 64 can be completely withdrawn from tube 50, or they can be partially retracted to such an extent that they do not disturb the flow of reactants from conduit 60 through tube 50. Referring to FIG. 10, a layer 78 of cladding glass can be deposited on the inner surface of tube 50 in a conventional manner. In order to form diametrically opposed longitudinal expansion strips within the cladding, a second reactant material is flowed through tubes 64 while the cladding reactant material continues to flow into conduit 60. For example, $SiCl_4$ and $BCl_3$ can be flowed into conduit 60 in order to deposit within tube 50 a layer 78 of cladding glass. After layer 78 has become sufficiently thick, tubes 64 are positioned adjacent to the hot zone and a reactant material such as $GeCl_4$ is flowed therethrough while the $SiCl_4$ and $BCl_3$ continue to flow into conduit 60. Oxygen to be employed in the reaction is also flowed into the hot zone in a manner known in the art. A layer 80 of borosilicate glass is deposited on the inner surface of layer 78, the stippled portions 82 of layer 80 containing $GeO_2$. Thereafter, an additional layer 84 of borosilicate cladding material can be deposited on layer 80, and a layer 86 of core material, e.g. $GeO_2$ doped $SiO_2$, can be deposited on layer 84. The resultant preform is then collapsed and drawn into a fiber in the manner described hereinabove. Regions 82 of layer 80 contain a sufficient amount of dopant material, e.g. $GeO_2$, to form within the resultant fiber longitudinal strips of high expansion glass.

After forming the preform of FIG. 10, it is collapsed to form a solid draw blank which is inserted in a draw furnace where it is heated to a temperature sufficiently high to permit a fiber to be drawn therefrom. The resultant fiber, which is illustrated in cross-section in FIG. 11, comprises a core 90, an inner cladding region 92 and an outer cladding region 96. On opposite sides of core 90 and within region 96 are two longitudinally-extending regions 94 of high expansion glass. There is a gradual change between regions 94 and the surrounding glass because of the mixture of gases during deposition of the glass and because of the diffusion of dopants during various high temperature steps to which the glass is subjected.

Figure 11:
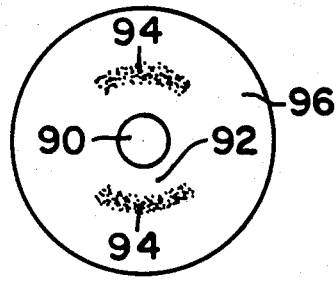
FIG. 11 is a cross-sectional view of a fiber which can be formed from the preform shown in FIG. 7 or from that shown in FIG. 10.

The cross-sectional configuration of fiber shown in FIG. 11 will also result from consolidating and drawing a soot preform of the type shown in FIG. 7.

We claim:

1. A single-mode optical waveguide fiber comprising a core of transparent glass and a layer of cladding glass on the surface of said core, the refractive index of said core being greater than that of said cladding glass, a first pair of diametrically opposed longitudinally-extending glass regions located in said cladding, said regions being spaced from said core, the thermal coefficient of expansion of said glass regions being different than that of said cladding glass.

2. An optical waveguide in accordance with claim 1 wherein the thermal coefficient of expansion of said first pair of diametrically opposed regions is greater than that of said cladding glass.

3. An optical waveguide in accordance with claim 1 wherein the thermal coefficient of expansion of said first pair of diametrically opposed regions is lower than that of said cladding glass.

4. An optical waveguide in accordance with claim 1 wherein the thermal coefficient of expansion of said first pair of diametrically opposed regions is greater than that of said cladding glass and said waveguide further comprises a second pair of longitudinally extending regions which is orthogonally disposed with respect to said two diametrically opposed regions, said second pair of regions having physical characteristics different from those of said first pair of regions.

5. An optical waveguide in accordance with claim 4 wherein the thermal coefficient of expansion of said second pair of regions is less than that of said cladding glass.

6. An optical waveguide in accordance with claim 1 wherein the minimum radius of said longitudinally-extending regions is at least 1.5 times the radius of said core.

7. An optical waveguide in accordance with claim 6 wherein each of said longitudinally-extending regions is circular in cross-section.

8. An optical waveguide in accordance with claim 6 wherein each of said longitudinally extending regions is crescent-shaped in cross-section.

9. An optical waveguide in accordance with claim 6 wherein each of said longitudinally extending regions is sector-shaped in cross-section, whereby the cross-sectional configuration of each of each of said longitudinally extending regions is such that the inner and outer surfaces of said regions are circular, the inner circular surface of each region being smaller than the outer circular surface thereof.

10. An optical waveguide in accordance with claim 1 wherein said longitudinally-extending regions are formed of light-absorbing material, and wherein the minimum radius of said regions is at least 3 times the radius of said core.

* * * * *